US010899220B1

(12) United States Patent
Payne et al.

(10) Patent No.: US 10,899,220 B1
(45) Date of Patent: Jan. 26, 2021

(54) HYBRID MODULE WITH SEQUENTIAL CLUTCH

(71) Applicant: Schaeffler Technologies AG & Co. KG, Herzogenaurach (DE)

(72) Inventors: Matthew Payne, Glenmont, OH (US); Christopher Shamie, Brighton, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/875,325

(22) Filed: May 15, 2020

(51) Int. Cl.
*B60K 6/387* (2007.10)
*F16H 41/24* (2006.01)
*F16H 45/02* (2006.01)

(52) U.S. Cl.
CPC .............. *B60K 6/387* (2013.01); *F16H 41/24* (2013.01); *F16H 45/02* (2013.01); *B60Y 2200/92* (2013.01); *B60Y 2400/426* (2013.01)

(58) Field of Classification Search
CPC ................ B60K 6/38; B60Y 2400/426; B60Y 2200/92; F16D 13/52; F16D 13/70; F16H 45/02; F16H 41/24; F16H 2041/243; F16H 2045/002; F16H 2045/028; F16H 2045/0284
See application file for complete search history.

(56) References Cited

U.S. PATENT DOCUMENTS

| 5,789,823 A * | 8/1998 | Sherman | F16H 61/62 290/47 |
| 8,607,948 B2 * | 12/2013 | Sturgin | F16D 33/00 192/3.25 |
| 2020/0158212 A1 * | 5/2020 | Brehmer | B60K 6/365 |

FOREIGN PATENT DOCUMENTS

WO   WO-2019197104 A1 * 10/2019 ............. B60K 6/387

* cited by examiner

*Primary Examiner* — Charles A Fox
*Assistant Examiner* — Farhana Pervin
(74) *Attorney, Agent, or Firm* — Kevin Parks

(57) ABSTRACT

A hybrid module includes a torque converter, an electric motor, a cover plate, a connecting pin, a piston, and a pressure plate. The torque converter includes a turbine and an impeller, arranged together to form a hydrodynamic torus. The electric motor includes a rotor with a rotor carrier drivingly engaged with the impeller. The cover plate is fixed to and radially inside of the rotor carrier, and includes a tubular portion with an orifice. The connecting pin is sealed to the tubular portion and extends through the orifice. The piston is disposed on a first axial side of the cover plate, is fixed to the connecting pin, and is arranged to engage a torque converter clutch, and the pressure plate is disposed on a second axial side of the cover plate, opposite the first axial side, is fixed to the connecting pin, and is arranged to engage a K0 clutch.

11 Claims, 1 Drawing Sheet

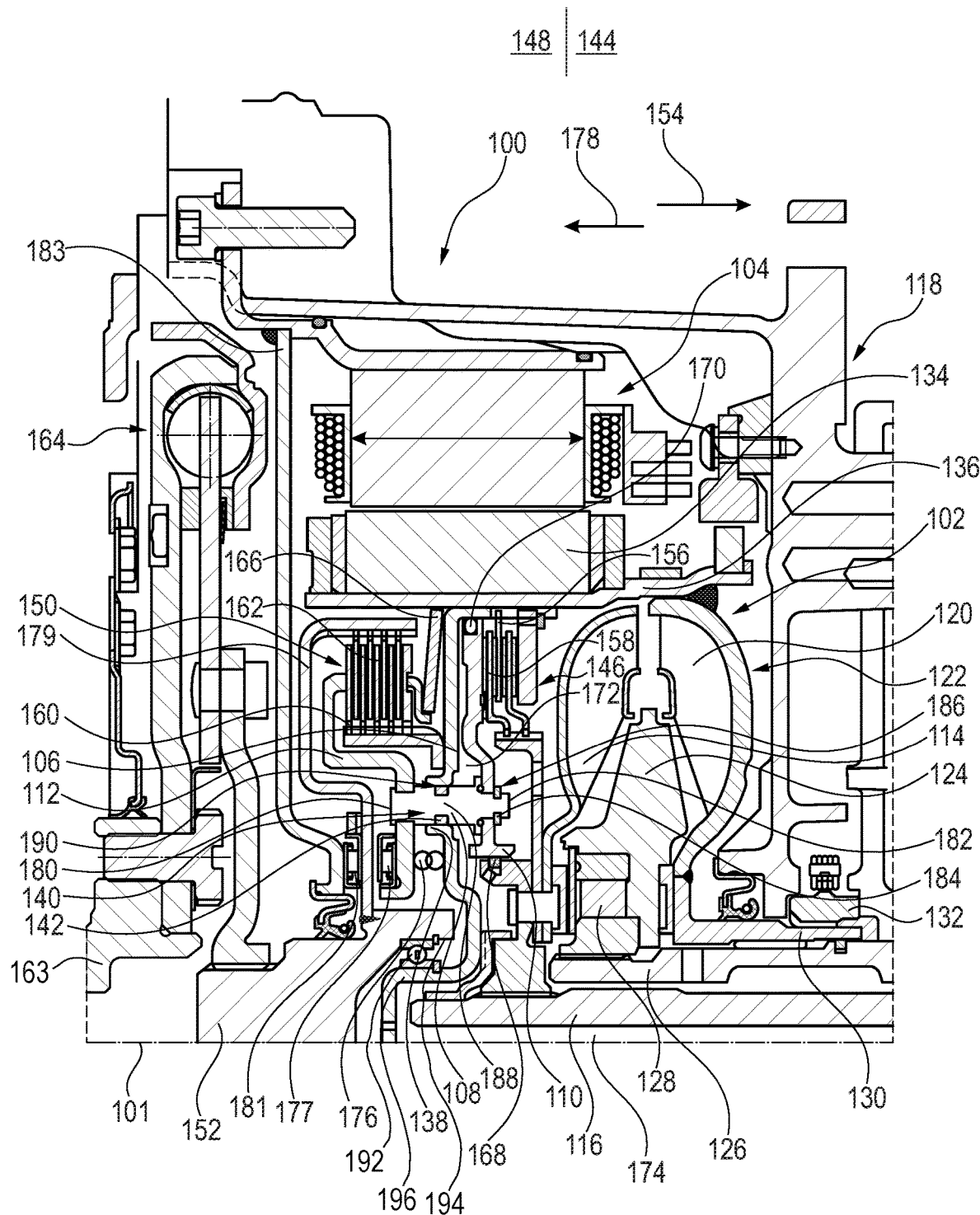

HYBRID MODULE WITH SEQUENTIAL CLUTCH

TECHNICAL FIELD

The present disclosure relates generally to a hybrid module, and more specifically to a hybrid module with a sequential clutch.

BACKGROUND

Commonly-assigned U.S. Pat. No. 8,607,948 describes a launch device with a first clutch engaged by a first pressure and a second clutch engaged by a second pressure greater than the first pressure.

SUMMARY

Example aspects broadly comprise a hybrid module including a torque converter, an electric motor, a cover plate, a connecting pin, a piston, and a pressure plate. The torque converter includes a turbine, arranged to connect to an input shaft of a multi-speed transmission, and an impeller, arranged with the turbine to form a hydrodynamic torus. The electric motor includes a rotor with a rotor carrier drivingly engaged with the impeller. The cover plate is fixed to and radially inside of the rotor carrier, and includes a tubular portion with an orifice. The connecting pin is sealed to the tubular portion and extends through the orifice. The piston is disposed on a first axial side of the cover plate, is fixed to the connecting pin, and is arranged to engage a torque converter clutch, and the pressure plate is disposed on a second axial side of the cover plate, opposite the first axial side, is fixed to the connecting pin, and is arranged to engage a K0 clutch.

In an example embodiment, a first displacement of the piston in a first axial direction towards the impeller engages the K0 clutch, and a second displacement of the pressure plate in the first axial direction engages the torque converter clutch. In an example embodiment, the torque converter clutch includes a first clutch plate drivingly engaged with the rotor carrier and a second clutch plate drivingly engaged with the turbine, and the K0 clutch includes a third clutch plate drivingly engaged with the rotor carrier and a fourth clutch plate arranged for driving engagement with a crankshaft of an internal combustion engine. In an example embodiment, the K0 clutch is necessarily engaged when the torque converter clutch is engaged.

In some example embodiments, the hybrid module has a plate spring, or diaphragm spring, disposed on the second axial side of the cover plate axially between the fourth clutch plate and the cover plate. In an example embodiment, the plate spring is compressed when the torque converter clutch is engaged. In an example embodiment, the K0 clutch is arranged to be engaged by a first pressure acting on the piston, and the torque converter clutch is arranged to be engaged by a second pressure, greater than the first pressure, acting on the piston. In an example embodiment, the hybrid module has a release spring disposed axially between the pressure plate and the cover plate and arranged to disengage the K0 clutch and the torque converter clutch.

In an example embodiment, the connecting pin includes a first axial end fixed to a one of the piston or the pressure plate by deforming the first axial end, a second axial end fixed to the other of the piston or the pressure plate by a snap ring disposed in a first groove of the connecting pin, and a center portion axially between the first axial end and the second axial end sealed to the tubular portion by a connecting pin seal disposed in a second groove of the connecting pin. In an example embodiment, the hybrid module includes a K0 shaft with a bore, and the cover plate includes a pilot disposed in the bore. In an example embodiment, the hybrid module has a bearing disposed in the bore radially between the K0 shaft and the pilot.

Other example aspects broadly comprise a hybrid module including a K0 shaft, a torque converter, an electric motor, and a clutch system. The K0 shaft is arranged for driving connection with an internal combustion engine. The torque converter includes a turbine arranged for driving connection with a multi-speed transmission. The electric motor includes a rotor. The clutch system includes a first clutch arranged to selectively engage the rotor with the turbine, and a second clutch arranged to selectively engage the rotor with the K0 shaft. The first clutch is arranged for sequential engagement after engagement of the second clutch.

In some example embodiments, the first clutch includes a piston operated on by a hydraulic pressure and the second clutch includes a pressure plate fixed to the piston. In an example embodiment, the second clutch includes a plate spring arranged to be compressed when the first clutch is engaged. In an example embodiment, the first clutch and the second clutch include respective pluralities of clutch plates. In an example embodiment, a first displacement of the piston engages the second clutch and a second displacement of the piston, greater than the first displacement, engages the first clutch. In an example embodiment, the hybrid module has a release spring arranged to displace the pressure plate to disengage the first clutch and the second clutch. In an example embodiment, the hybrid module includes a damper arranged in a torque path between the K0 shaft and the internal combustion engine.

BRIEF DESCRIPTION OF THE DRAWINGS

The single FIGURE illustrates a top half cross-sectional view of a hybrid module with a sequential clutch according to an example embodiment.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

The following description is made with reference to the single FIGURE. The single FIGURE illustrates a top half cross-sectional view of hybrid module 100 with sequential clutch 102 according to an example embodiment. Hybrid module 100 includes torque converter 102, electric motor 104, cover plate 106, connecting pin 108, piston 110, and pressure plate 112 fixed to piston 110. Hybrid module 100 may include a plurality of connecting pins 108 distributed circumferentially about axis 101. The torque converter includes turbine 114 arranged to connect to input shaft 116 of a multi-speed transmission (partially shown at 118), and impeller 120 arranged with the turbine to form hydrodynamic torus 122. Otherwise stated, the turbine is arranged for driving connection with a multi-speed transmission. Torque converter 102 may also include stator 124 arranged to connect to stator shaft 126 via one-way clutch 128. Impeller 120 may include impeller hub 130, fixed to the impeller, to drive pump 132 of the multi-speed transmission.

The electric motor includes rotor 134 with rotor carrier 136 drivingly engaged with the impeller. The cover plate is fixed to and radially inside of the rotor carrier. The cover plate includes tubular portion 138 with orifice 140. In the embodiment shown in the FIGURE, tubular portion 138 is extruded from a same piece of material as cover plate 106 to form an inner cylindrical surface. In other embodiments (not shown), the tubular portion may be an additional component fixed in an orifice of the cover plate. The connecting pin is sealed to the tubular portion by connecting pin seal 142, for example, and extends through the orifice. That is, a portion of pin 108 extends through the orifice beyond opposite axial sides of the cover plate such that it is axially displaceable relative to the cover plate.

The piston is disposed on axial side 144 of the cover plate, fixed to the connecting pin, and arranged to engage torque converter clutch 146. Torque converter clutch 146 includes piston 110. Clutch 146 is arranged to selectively engage the rotor with the turbine. In other words, piston 110 is arranged to compress clutch plates of the torque converter clutch to rotationally connect the turbine with the cover plate in response to a hydraulic pressure as described in more detail below. The pressure plate is disposed on axial side 148 of the cover plate, opposite axial side 144, is fixed to the connecting pin, and is arranged to engage K0 clutch, or driveline clutch, 150 in a manner similar to the engagement of torque converter clutch 146. K0 clutch 150 includes the pressure plate. The K0 clutch is arranged to rotationally connect cover plate 106 with K0 shaft 152 to selectively engage the rotor with the K0 shaft. The K0 shaft is arranged for driving connection with an internal combustion engine as described in more detail below.

During operation of the hybrid module, a first displacement of the piston in axial direction 154 towards the impeller engages the K0 clutch, and a second displacement of the pressure plate in axial direction 154 engages the torque converter clutch. The torque converter clutch is arranged for sequential engagement after engagement of the K0 clutch. In other words, the K0 clutch is necessarily engaged when the torque converter clutch is engaged. The torque converter clutch and the K0 clutch include respective pluralities of clutch plates. Torque converter clutch 146 includes clutch plate 156 drivingly engaged with the rotor carrier, and clutch plate 158 drivingly engaged with the turbine. K0 clutch includes clutch plate 160 drivingly engaged with the rotor carrier and clutch plate 162 arranged for driving engagement with crankshaft 163 of an internal combustion engine (through K0 shaft 152 and damper 164, for example).

Hybrid module 100 includes plate spring 166 disposed on axial side 148 of the cover plate axially between the clutch plate 162 and the cover plate. K0 clutch 150 includes plate spring 166. The plate spring is compressed when the torque converter clutch is engaged. The K0 clutch is arranged to be engaged by a first pressure acting on the piston, and the torque converter clutch is arranged to be engaged by a second pressure, greater than the first pressure, acting on the piston. In other words, pressure acting on the piston pulls the pressure plate via the connecting pin to engage the K0 clutch.

Force from the plate spring allows the K0 clutch to engage without additional displacement of the piston. When pressure is increased, the force from the piston pulling on the pressure plate exceeds the plate spring force and the piston is displaced to engage the torque converter clutch. So, a first displacement of the piston engages the K0 clutch and a second displacement of the piston, greater than the first displacement, engages the torque converter clutch. Otherwise stated, the plate spring is arranged to be compressed when the torque converter clutch is engaged.

The piston, cover plate, connecting pin, connecting pin seal, and piston seals 168 and 170 form apply chamber 172 so that pressurized oil introduced through input shaft bore 174 acts on, or operates on, the piston to sequentially engage clutches 146 and 150. Release spring 176 is disposed axially between the pressure plate and the cover plate. The release spring is arranged to displace the pressure plate to disengage the K0 clutch and the torque converter clutch. In other words, force from the release spring acting between the pressure plate and the cover plate urges the pressure plate in axial direction 178, opposite axial direction 154, when pressure in chamber 172 is reduced. Force from release spring 176 is reacted through bearing 177, outer clutch carrier 179 fixed to K0 shaft 152, and bearing 181 to housing wall 183 when pressure in chamber 172 is low.

Connecting pin 108 includes axial end 180 fixed to the pressure plate by deforming the axial end 180 and axial end 182 fixed to the piston by snap ring 184 disposed in groove 186 of the connecting pin. Connecting pin 108 also includes center portion 188 axially between axial end 180 and axial end 182. The center portion is sealed to the tubular portion by seal 142 disposed in groove 190 of the connecting pin.

Hybrid module 100 also includes K0 shaft 152 and bearing 192. The K0 shaft includes bore 194 and cover plate 106 includes pilot 196 disposed in the bore. Bearing 192 is disposed in the bore radially between the K0 shaft and the pilot. Damper 164 is arranged in a torque path between the K0 shaft and the internal combustion engine.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Hybrid module
101 Axis
102 Torque converter
104 Electric motor
106 Cover plate
108 Connection pin
110 Piston
112 Pressure plate
114 Turbine
116 Input shaft
118 Multi-speed transmission (partial)
120 Impeller
122 Hydrodynamic torus
124 Stator
126 Stator shaft
128 One-way clutch
130 Impeller hub
132 Pump (multi-speed transmission)
134 Rotor
136 Rotor carrier
138 Tubular portion
140 Orifice
142 Connecting pin seal
144 Axial side (first)
146 Torque converter clutch
148 Axial side (second)
150 K0 clutch
152 K0 shaft
154 Axial direction (first)
156 Clutch plate (first)
158 Clutch plate (second)
160 Clutch plate (third)
162 Clutch plate (fourth)
164 Damper
166 Plate spring
168 Piston seal (ID)
170 Piston seal (OD)
172 Apply chamber
174 Input shaft bore
176 Release spring
177 Bearing
178 Axial direction (second)
179 Outer clutch carrier
180 Axial end (first)
181 Bearing
182 Axial end (second)
183 Housing wall
184 Snap ring
186 Groove (first)
188 Center portion
190 Groove (second)
192 Bearing
194 Bore
196 Pilot

What is claimed is:

1. A hybrid module comprising:
a torque converter comprising:
a turbine, arranged to connect to an input shaft of a multi-speed transmission; and
an impeller, arranged with the turbine to form a hydrodynamic torus;
an electric motor comprising a rotor with a rotor carrier drivingly engaged with the impeller;
a cover plate fixed to and radially inside of the rotor carrier, the cover plate comprising a tubular portion with an orifice;
a connecting pin sealed to the tubular portion and extending through the orifice;
a piston disposed on a first axial side of the cover plate, fixed to the connecting pin, and arranged to engage a torque converter clutch; and
a pressure plate disposed on a second axial side of the cover plate, opposite the first axial side, fixed to the connecting pin, and arranged to engage a driveline clutch.

2. The hybrid module of claim 1 wherein:
a first displacement of the piston in a first axial direction towards the impeller engages the driveline clutch; and
a second displacement of the pressure plate in the first axial direction engages the torque converter clutch.

3. The hybrid module of claim 1 wherein:
the torque converter clutch comprises a first clutch plate drivingly engaged with the rotor carrier and a second clutch plate drivingly engaged with the turbine; and
the driveline clutch comprises a third clutch plate drivingly engaged with the rotor carrier and a fourth clutch plate arranged for driving engagement with a crankshaft of an internal combustion engine.

4. The hybrid module of claim 1 wherein the driveline clutch is necessarily engaged when the torque converter clutch is engaged.

5. The hybrid module of claim 1 further comprising a plate spring, wherein the driveline clutch comprises a clutch plate and the plate spring is disposed on the second axial side of the cover plate axially between the clutch plate and the cover plate.

6. The hybrid module of claim 5 wherein the plate spring is compressed when the torque converter clutch is engaged.

7. The hybrid module of claim 1 wherein:
the driveline clutch is arranged to be engaged by a first pressure acting on the piston; and
the torque converter clutch is arranged to be engaged by a second pressure, greater than the first pressure, acting on the piston.

8. The hybrid module of claim 1 further comprising a release spring disposed axially between the pressure plate and the cover plate and arranged to disengage the driveline clutch and the torque converter clutch.

9. The hybrid module of claim 1 wherein the connecting pin comprises:
a first axial end fixed to a one of the piston or the pressure plate by deforming the first axial end;
a second axial end fixed to the other of the piston or the pressure plate by a snap ring disposed in a first groove of the connecting pin; and a center portion axially between the first axial end and the second axial end sealed to the tubular portion by a connecting pin seal disposed in a second groove of the connecting pin.

10. The hybrid module of claim 1 further comprising a K0 shaft with a bore, wherein the cover plate comprises a pilot disposed in the bore.

11. The hybrid module of claim 10 further comprising a bearing disposed in the bore radially between the K0 shaft and the pilot.

\* \* \* \* \*